US012560809B2

(12) United States Patent
Takahashi et al.

(10) Patent No.: US 12,560,809 B2
(45) Date of Patent: Feb. 24, 2026

(54) HEAD UP DISPLAY

(71) Applicant: Magnolia White Corporation, Tokyo (JP)

(72) Inventors: Yasuhiro Takahashi, Tokyo (JP); Shinichi Komura, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 297 days.

(21) Appl. No.: 18/526,293

(22) Filed: Dec. 1, 2023

(65) Prior Publication Data

US 2024/0184110 A1 Jun. 6, 2024

(30) Foreign Application Priority Data

Dec. 6, 2022 (JP) ................................. 2022-195184

(51) Int. Cl.
*G02B 27/01* (2006.01)
*G02B 5/30* (2006.01)
*G02B 27/28* (2006.01)

(52) U.S. Cl.
CPC ....... *G02B 27/0101* (2013.01); *G02B 5/3016* (2013.01); *G02B 27/283* (2013.01); *G02B 2027/0118* (2013.01)

(58) Field of Classification Search
CPC .............. G02B 27/0101; G02B 5/3016; G02B 27/283; G02B 2027/0118; G02B 5/30; G02B 27/286
See application file for complete search history.

(56) References Cited

U.S. PATENT DOCUMENTS

2023/0302901 A1* 9/2023 Pankratz .............. G02B 27/283

FOREIGN PATENT DOCUMENTS

JP 2007-065011 A 3/2007

* cited by examiner

*Primary Examiner* — Charles S Chang
(74) *Attorney, Agent, or Firm* — Maier & Maier, PLLC

(57) ABSTRACT

According to an aspect, a head up display includes, inside a case: a display panel that is configured to emit light to project an image; a first mirror that is configured to reflect light having passed through the display panel; and a semi-reflective mirror provided between the display panel and the first mirror. The semi-reflective mirror includes a cholesteric liquid crystal layer that is configured to transmit light from the display panel and reflect light from the first mirror. An acute angle is formed between a surface of the semi-reflective mirror through which light from the display panel is transmitted and a surface of the display panel through which light from the display panel is emitted.

11 Claims, 17 Drawing Sheets

LC

LC

HEAD UP DISPLAY

CROSS-REFERENCE TO RELATED APPLICATION

This application claims the benefit of priority from Japanese Patent Application No. 2022-195184 filed on Dec. 6, 2022, the entire contents of which are incorporated herein by reference.

BACKGROUND

1. Technical Field

What is disclosed herein relates to a head up display.

2. Description of the Related Art

A head up display (hereinafter referred to as HUD) configured to project an image onto a light-transmitting body such as a front window so that a virtual image is visually recognized by a user has been known as one of display devices (for example, Japanese Patent Application Laid-open Publication No. 2007-65011). The HUD can provide an increased stereoscopic effect of the virtual image when a transmissive liquid crystal panel provided on the optical axis of projected light and configured to output an image is tilted relative to a direction orthogonal to the optical axis.

However, the luminance of the virtual image decreases when the liquid crystal panel is simply tilted relative to the direction orthogonal to the optical axis. Thus, a method of reducing the amount of decrease of the luminance of the virtual image and increasing the stereoscopic effect of the virtual image has been requested.

For the foregoing reasons, there is a need for a head up display that can reduce the amount of decrease of the luminance of a virtual image while maintaining the stereoscopic effect of the virtual image.

SUMMARY

According to an aspect, a head up display includes, inside a case: a display panel that is configured to emit light to project an image; a first mirror that is configured to reflect light having passed through the display panel; and a semi-reflective mirror provided between the display panel and the first mirror. The semi-reflective mirror includes a cholesteric liquid crystal layer that is configured to transmit light from the display panel and reflect light from the first mirror. An acute angle is formed between a surface of the semi-reflective mirror through which light from the display panel is transmitted and a surface of the display panel through which light from the display panel is emitted.

DETAILED DESCRIPTION

Embodiments of the present disclosure will be described below with reference to the accompanying drawings. What is disclosed herein is merely exemplary, and any modification that could be easily thought of by the skilled person in the art as appropriate without departing from the gist of the invention is contained in the scope of the present disclosure. For clearer description, the drawings are schematically illustrated for the width, thickness, shape, and the like of each component as compared to an actual aspect in some cases, but the drawings are merely exemplary and do not limit interpretation of the present disclosure. In the present specification and the drawings, any element same as that already described with reference to an already described drawing is denoted by the same reference sign, and detailed description thereof is omitted as appropriate in some cases.

First Embodiment

Figure 1:
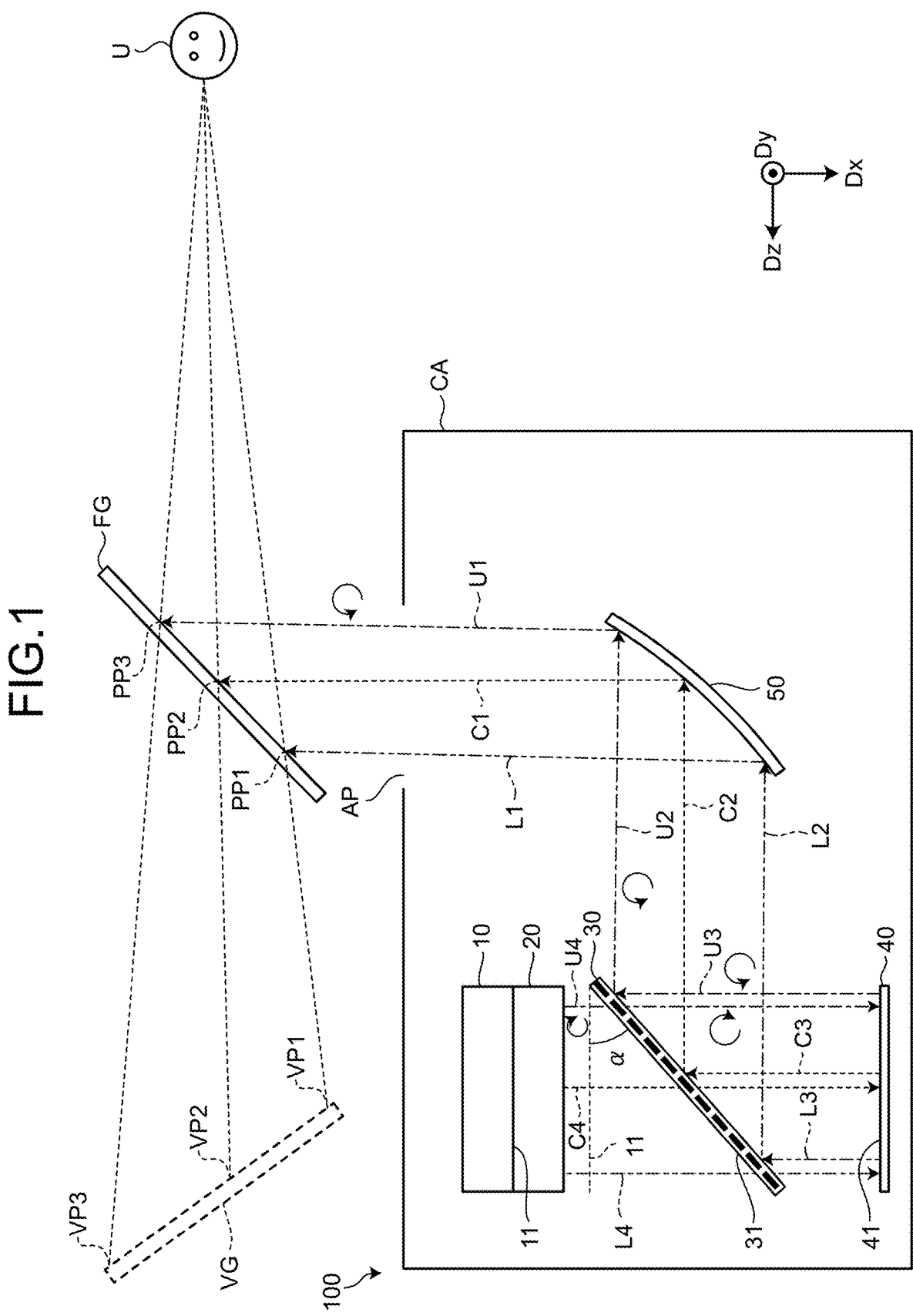
FIG. 1 is a schematic diagram illustrating an exemplary configuration of a head up display (HUD) according to a first embodiment.
Figure 2:
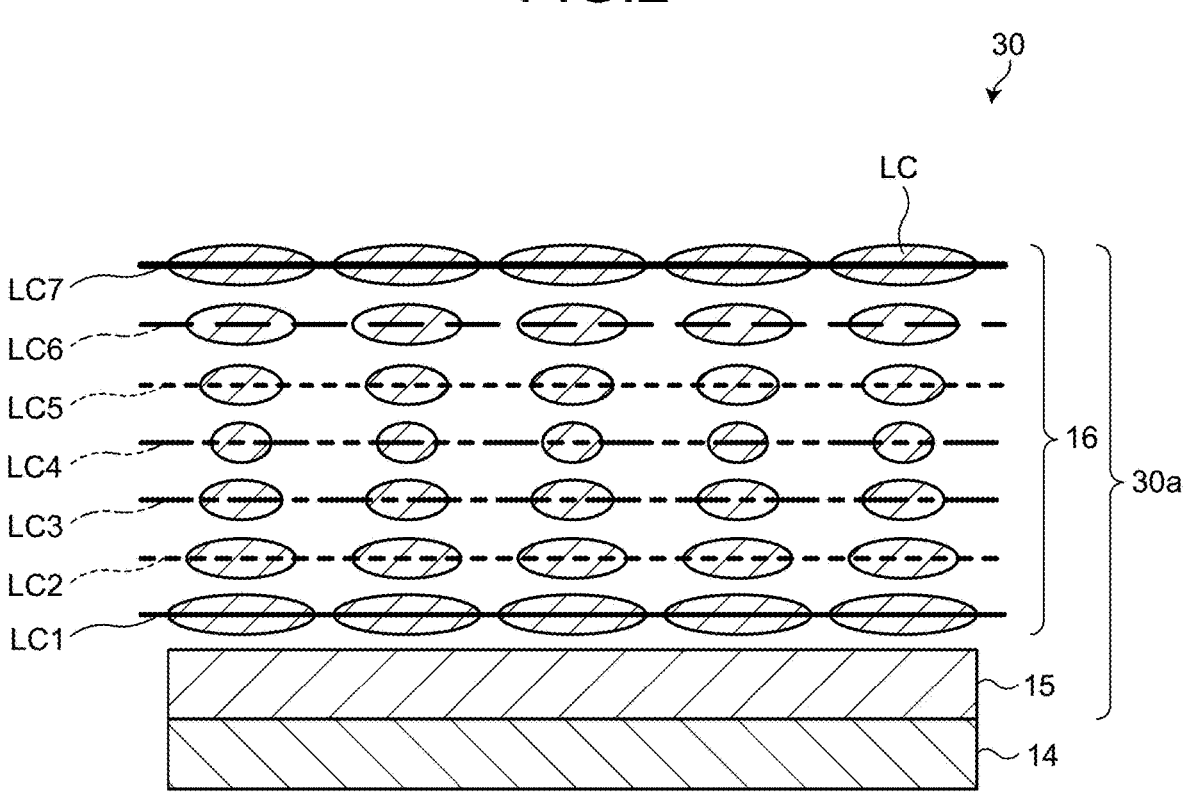
FIG. 2 is a sectional view schematically illustrating a cholesteric liquid crystal layer according to the first embodiment.
Figure 3:
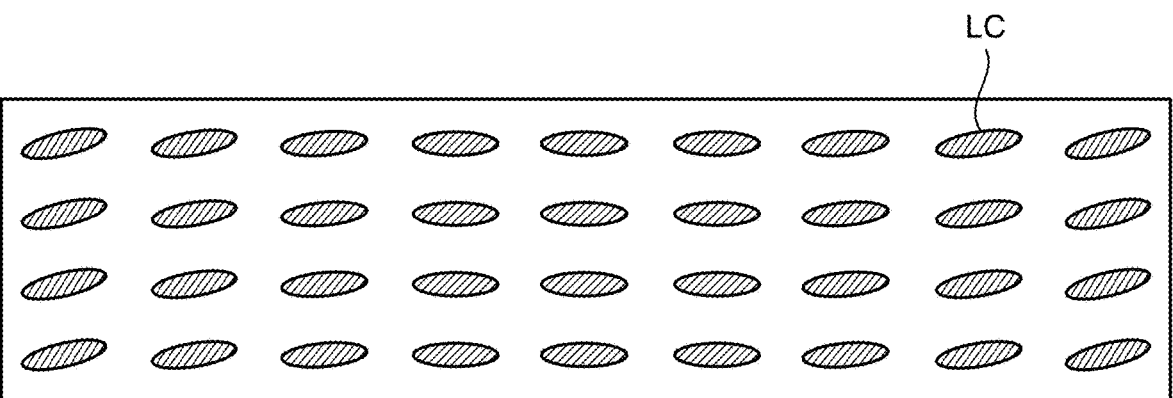
FIG. 3 is a plan view schematically illustrating a first layer and a seventh layer of the cholesteric liquid crystal layer according to the first embodiment.
Figure 4:
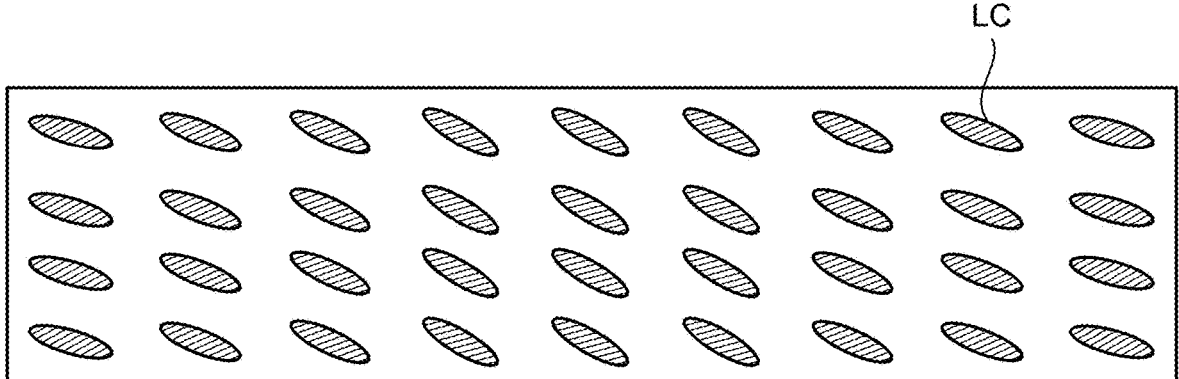
FIG. 4 is a plan view schematically illustrating a second layer of the cholesteric liquid crystal layer according to the first embodiment.
Figure 5:
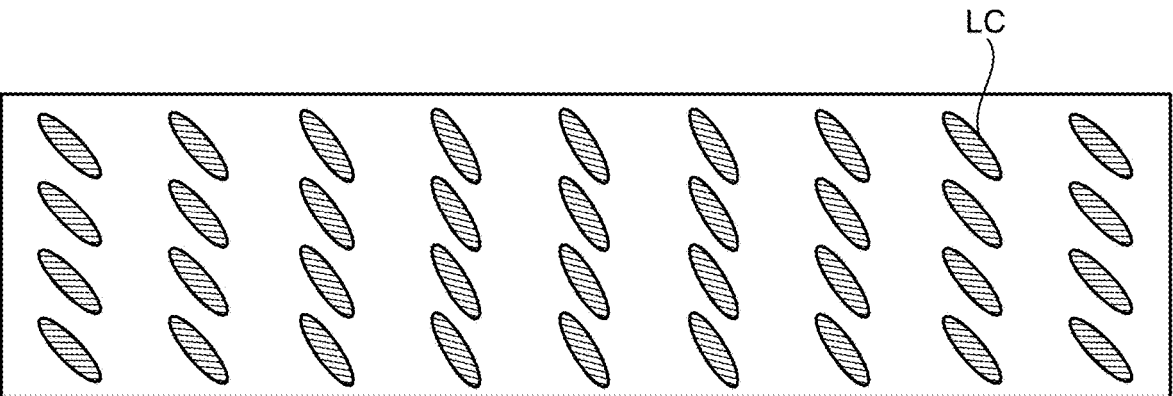
FIG. 5 is a plan view schematically illustrating a third layer of the cholesteric liquid crystal layer according to the first embodiment.
Figure 6:
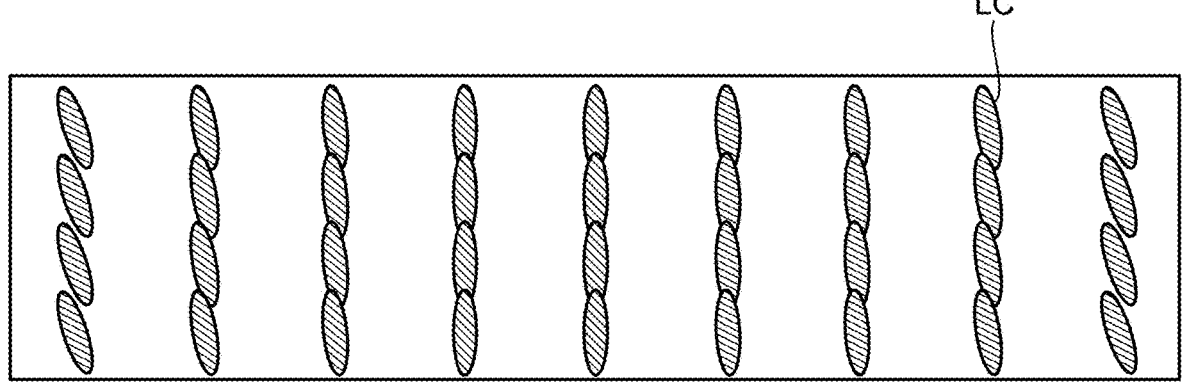
FIG. 6 is a plan view schematically illustrating a fourth layer of the cholesteric liquid crystal layer according to the first embodiment.
Figure 7:
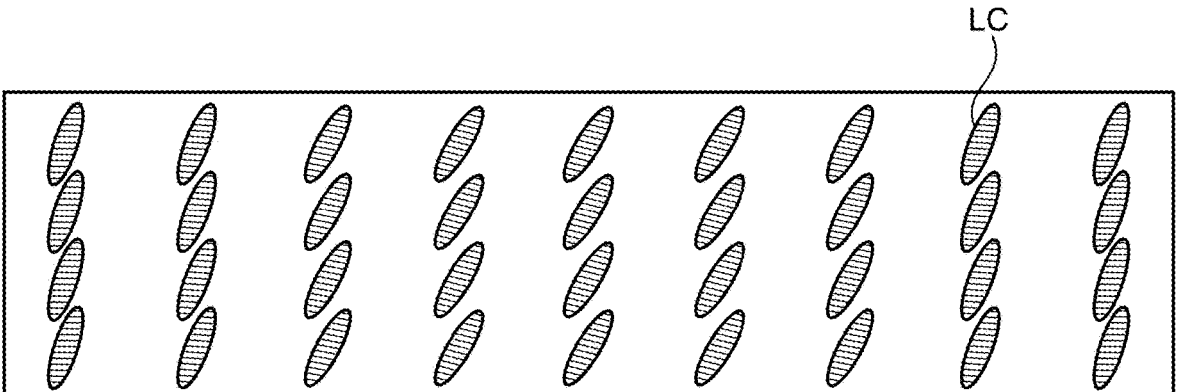
FIG. 7 is a plan view schematically illustrating a fifth layer of the cholesteric liquid crystal layer according to the first embodiment.
Figure 8:
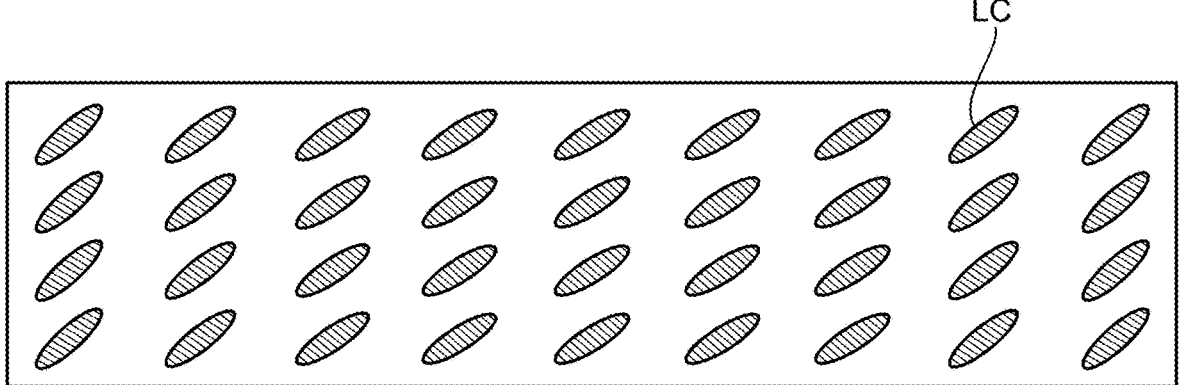
FIG. 8 is a plan view schematically illustrating a sixth layer of the cholesteric liquid crystal layer according to the first embodiment.

FIG. 1 is a schematic diagram illustrating an exemplary configuration of a head up display (HUD) according to a first embodiment. FIG. 2 is a sectional view schematically illustrating a cholesteric liquid crystal layer according to the first embodiment. FIG. 3 is a plan view schematically illustrating a first layer and a seventh layer of the cholesteric liquid crystal layer according to the first embodiment. FIG. 4 is a plan view schematically illustrating a second layer of the cholesteric liquid crystal layer according to the first embodiment. FIG. 5 is a plan view schematically illustrating a third layer of the cholesteric liquid crystal layer according to the first embodiment. FIG. 6 is a plan view schematically illustrating a fourth layer of the cholesteric liquid crystal layer according to the first embodiment. FIG. 7 is a plan view schematically illustrating a fifth layer of the cholesteric liquid crystal layer according to the first embodiment. FIG. 8 is a plan view schematically illustrating a sixth layer of the cholesteric liquid crystal layer according to the first embodiment.

As illustrated in FIG. 1, a HUD 100 includes a display panel 10, a first ¼ wave plate 20, a semi-reflective mirror 30, and a first mirror 40. Hereinafter, a Dx direction is defined to be the height direction of the HUD. In addition, a Dy direction is defined to be the width direction of the HUD, and a Dz direction is defined to be the depth direction of the HUD. The Dx, Dy, and Dz directions are examples and the present disclosure is not limited to these directions.

The display panel 10 is what is called a liquid crystal display panel (LCD). An image is projected on a projection target member FG by the HUD 100. The display panel 10 of the HUD 100 is configured to project an image onto the projection target member FG (for example, a front window) so that a virtual image VG is visually recognized by a user U. The projection target member FG is not limited to a front window but may be, for example, a windshield, or a light-transmitting plate member called a combiner provided separately from a front window. A plurality of light emitting elements (not illustrated) are provided on the back surface side of the display panel 10 and function as a light source configured to emit light from the back surface side of the display panel 10. Each light emitting element is, for example, a light emitting diode (LED), but not limited thereto and may be any other configuration that functions in the same manner, such as an organic light emitting diode (OLED). Each light emitting element may be an inorganic light emitting diode (micro LED or mini LED).

As illustrated in FIG. 1, light is emitted from the display panel 10. Light from the display panel 10 passing through the semi-reflective mirror 30 is referred to as light L4, light C4, and light U4.

The first ¼ wave plate 20 converts linearly polarized light emitted from the display panel 10 into circularly polarized light.

As illustrated in FIG. 1, the semi-reflective mirror 30 includes a cholesteric liquid crystal layer 30a that transmits light emitted from the display panel 10 and reflects light reflected by the first mirror 40. The semi-reflective mirror 30 is disposed closer to the front side of a vehicle than the projection target member FG. The semi-reflective mirror 30 is disposed between the display panel 10 and the first mirror 40 in the Dx direction. An angle α is an acute angle that is formed between a surface 31 of the semi-reflective mirror 30 through which light from the display panel 10 is transmitted and a surface 11 of the display panel 10 through which light is emitted to the semi-reflective mirror 30.

As illustrated in FIG. 2, in the cholesteric liquid crystal layer 30a, a liquid crystal layer 16 is formed on a light-transmitting substrate 14 with an alignment film 15 interposed therebetween. The alignment film 15 is made of, for example, polyimide and subjected to rubbing processing and light orientation processing. In a cholesteric liquid crystal, elongated liquid crystal molecules LC in each plane are arrayed with the directions of their long axes aligned and helically rotate around an axis along a direction orthogonal to the plane of the light-transmitting substrate 14. Specifically, as illustrated in FIGS. 3 to 8, the liquid crystal molecules LC rotate through a first layer LC1, a second layer LC2, a third layer LC3, a fourth layer LC4, a fifth layer LC5, a sixth layer LC6, and a seventh layer LC7 illustrated in FIG. 2. The directions of the long axes of the liquid crystal molecules LC align at each ½ of a pitch p of the helix, and thus the long-axis directions of the liquid crystal molecules LC in the first layer LC1 are same as the long-axis directions of the liquid crystal molecules LC in the seventh layer LC7 as illustrated in FIG. 3.

Figure 9:
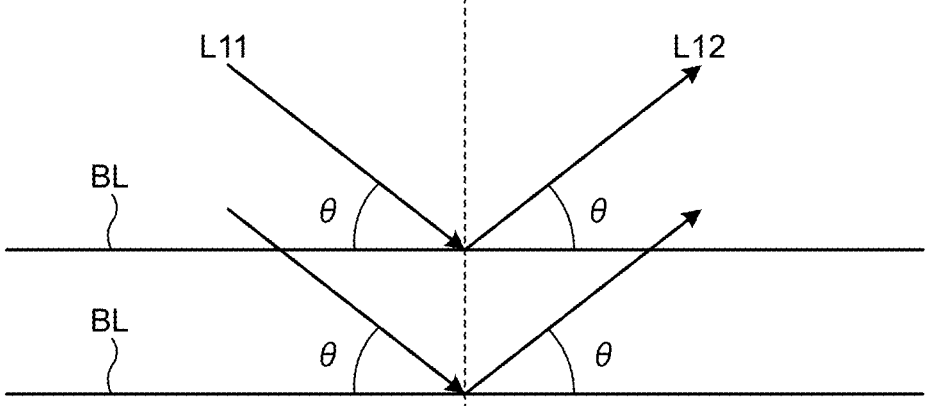
FIG. 9 is an explanatory diagram for description of the relation between incident light and reflected light.

FIG. 9 is an explanatory diagram for description of the relation between incident light and reflected light. The cholesteric liquid crystal layer 30a reflects light having a predetermined wavelength and circularly polarized in a rotational direction same as the rotational direction of the helix. As illustrated in FIG. 9, incident light L11 incident on the cholesteric liquid crystal layer 30a is reflected in accordance with the same condition as Bragg's law expressed in Expression (1).

$$2\times(p/2)\times n\times \sin\,\theta = m\times\lambda \qquad (1)$$

In the expression, m represents the order of reflection, λ represents the reflection wavelength, p represents the pitch of the helix, n represents the refractive index, and θ represents the angle of the incident direction of the incident light relative to a Bragg plane BL.

As illustrated in FIG. 9, the incident light L11 is selectively reflected as a reflected light L12 in accordance with Bragg's law. For example, when a plurality of liquid crystal molecules rotate rightward, the cholesteric liquid crystal layer 30a reflects, as the reflected light L12, right-handed circularly polarized light having a wavelength corresponding to the pitch p in the incident light L11. On the other hand, when a plurality of liquid crystal molecules rotate leftward, the cholesteric liquid crystal layer 30a reflects, as the reflected light L12, left-handed circularly polarized light having a wavelength corresponding to the pitch p in the incident light L11. The present embodiment will be described for a case in which a plurality of liquid crystal molecules rotate leftward.

The cholesteric liquid crystal layer 30a is manufactured by selecting a liquid crystal material and a chiral agent corresponding to the wavelength of incident light.

The first mirror 40 is an optical element that reflects, to the semi-reflective mirror 30, light having passed through the semi-reflective mirror 30 in the direction from the display panel 10 toward the semi-reflective mirror 30. The first mirror 40 is disposed on the lower side of the semi-reflective mirror 30. Light reflected by the first mirror 40 in the light L4 is referred to as light L3. Light reflected by the first mirror 40 in the light C4 is referred to as light C3. Light reflected by the first mirror 40 in the light U4 is referred to as light U3.

As illustrated in FIG. 1, light reflected by the semi-reflective mirror 30 in the light L3 is referred to as light L2. Light reflected by the semi-reflective mirror 30 in the light C3 is referred to as light C2. Light reflected by the semi-reflective mirror 30 in the light U3 is referred to as light U2.

The HUD 100 further includes a second mirror 50 and a case CA. The second mirror 50 reflects light having passed through the cholesteric liquid crystal layer 30a and guides the light to the projection target member FG. The case CA surrounds the display panel 10, the first ¼ wave plate 20, the semi-reflective mirror 30, the first mirror 40, and the second mirror 50. However, the case CA is provided with an opening part AP not to block the path of light between the second mirror 50 and the projection target member FG. As illustrated in FIG. 1, light reflected by the second mirror 50 and guided to the projection target member FG through the opening part AP is referred to as light L1, light C1, and light U1. The light L1 is the light L2 reflected by the second mirror 50 and projected onto a projection point PP1 of the projection target member FG. The light C1 is the light C2 reflected by the second mirror 50 and projected onto a projection point PP2 of the projection target member FG. The light U1 is the light U2 reflected by the second mirror 50 and projected onto a projection point PP3 of the projection target member FG.

The second mirror 50 is, for example, a concave mirror. The second mirror 50 may be made up of a plurality of concave mirrors and reflection mirrors.

The projection target member FG is a light-transmitting member provided outside the case CA. The projection target member FG is, for example, the front window of a four-wheel vehicle. The projection target member FG onto which an image is projected by the HUD 100 may be a light-transmitting resin. The projection target member FG may be a flat plate light-transmitting member or a curved light-transmitting member.

As illustrated in FIG. 9, the right-handed circularly polarized light U4 incident on the semi-reflective mirror 30 from the display panel 10 passes through the semi-reflective mirror 30 and is incident on the first mirror 40. The light U3 reflected by the first mirror 40 is circularly polarized in the inverted direction, that is, left-handed circularly polarized and is incident on the semi-reflective mirror 30. The light U2 reflected by the semi-reflective mirror 30 is incident on the second mirror 50 as left-handed circularly polarized light. The light U1 reflected by the second mirror 50 is projected as left-handed circularly polarized light onto the projection point PP3 of the projection target member FG.

An image projected from the HUD 100 onto the projection target member FG is recognized as the virtual image VG by the user U. As illustrated in FIG. 1, the color and brightness of light at a virtual image point VP1 of the virtual image VG correspond to the color and brightness of light projected onto the projection point PP1. The color and brightness of light at a virtual image point VP2 of the virtual image VG correspond to the color and brightness of light projected onto the projection point PP2. The color and brightness of light at a virtual image point VP3 of the virtual image VG correspond to the color and brightness of light projected onto the projection point PP3.

The positional relations of the virtual image points VP1, VP2, and VP3 recognized by the user U, in particular, the positional relations in the Dz direction thereof correspond to optical path lengths of the light U2, the light C2, and the light L2, respectively, and optical path lengths of the light U1, the light C1, and the light L1, respectively.

A distance (z1) between the viewpoint of the user U and the virtual image point VP1 corresponds to Expression (1) below. In the following Expression (1), t1 is a value indicating the optical path length of the light U2. In Expression (1), r1 is a value indicating the optical path length of the light U1. In the following Expression (1) and Expressions (2) and (3) to be described later, Ex represents an image magnification generated based on the optical path length between the semi-reflective mirror 30 and the projection target member FG.

$$z1 = r1 + t1 \times Ex \qquad (1)$$

A distance (z2) between the viewpoint of the user U and the virtual image point VP2 corresponds to Expression (2) below. In Expression (2), t2 is a value indicating the optical path length of the light C2. In Expression (2), r2 is a value indicating the optical path length of the light C1.

$$z2 = r2 + t2 \times Ex \qquad (2)$$

A distance (z3) between the viewpoint of the user U and the virtual image point VP3 corresponds to Expression (3) below. In Expression (3), t3 is a value indicating the optical path length of the light L2. In Expression (3), r3 is a value indicating the optical path length of the light L1.

$$z3 = r3 + t3 \times Ex \qquad (3)$$

The surface 11 of the display panel 10 through which light is emitted to the semi-reflective mirror 30 and a surface 41 of the first mirror 40 by which light is reflected to the semi-reflective mirror 30 are horizontal, and thus the magnitude relation between the optical path lengths of the light L4, the light C4, and the light U4 is U4=C4=L4. In this case, the magnitude relation between the optical path lengths of the light L2, the light C2, and the light U2 is U2=C2=L2. The magnitude relation between the optical path lengths of the light L1, the light C1, and the light U1 is U1=C1=L1. The magnitude relation between the optical path lengths of the light L3, the light C3, and the light U3 is U3>C3>L3, and thus difference in the optical path lengths occurs, which affects the depth of the virtual image VG and increases the stereoscopic effect of the virtual image that can be visually recognized by the user U.

With this configuration, the surface 11 of the display panel 10 through which light is emitted to the semi-reflective mirror 30 does not need to be tilted relative to the surface 41 of the first mirror 40 by which light is reflected to the semi-reflective mirror 30, and the HUD 100 can reduce the amount of decrease of the luminance of the virtual image while maintaining the stereoscopic effect of the virtual image.

Second Embodiment

Figure 10:
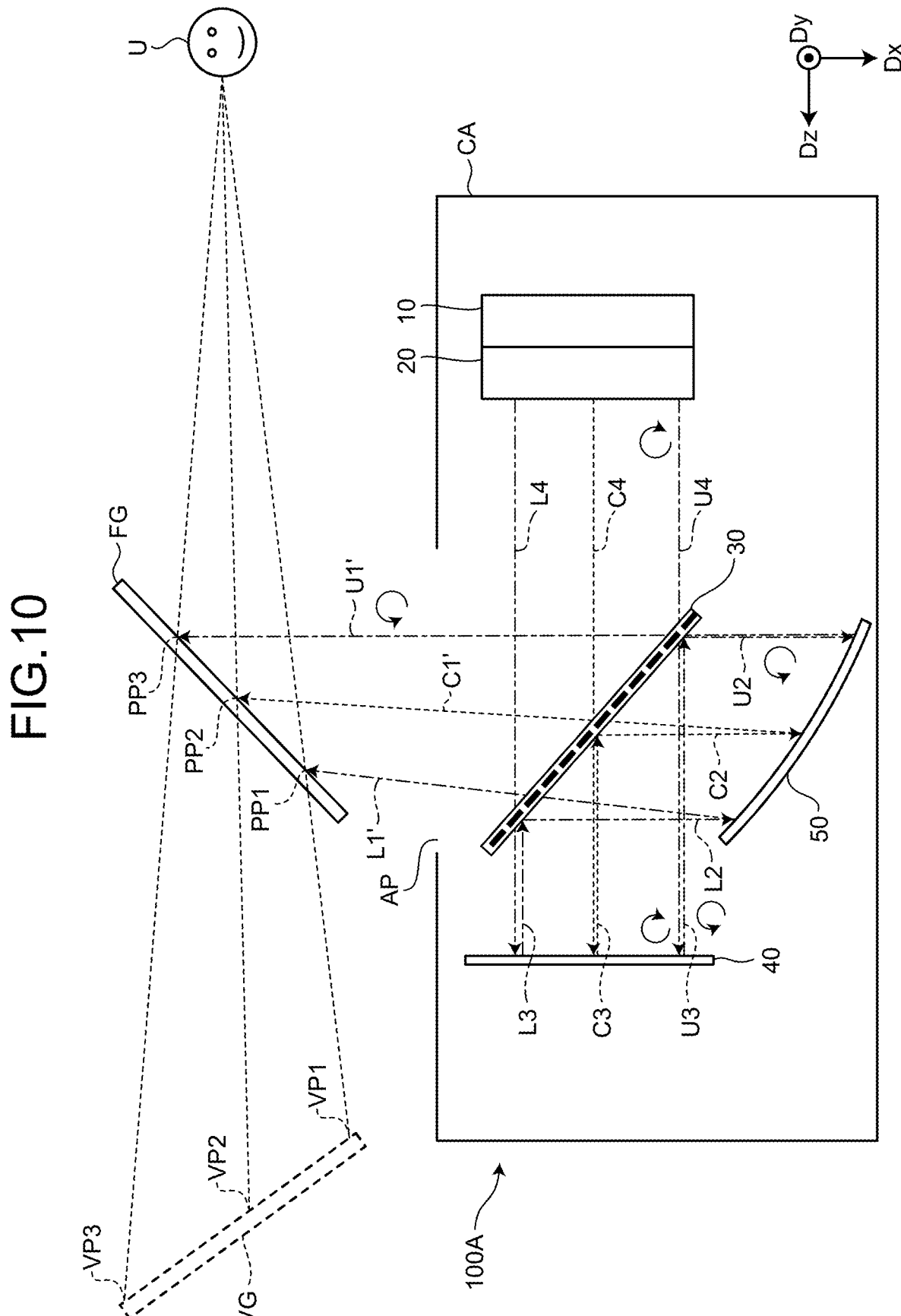
FIG. 10 is a schematic diagram illustrating an exemplary configuration of a HUD according to a second embodiment.

FIG. 10 is a schematic diagram illustrating an exemplary configuration of a HUD according to a second embodiment. In the following description, any constituent component same as that in the above-described embodiment is denoted by the same reference sign and duplicate description thereof is omitted. In addition, description of optical paths of light, which overlaps with description of the HUD according to the first embodiment, is omitted.

As illustrated in FIG. 10, a HUD 100A includes the display panel 10 provided with the light source on the back surface side thereof, the first ¼ wave plate 20, the semi-reflective mirror 30, the first mirror 40, and the second mirror 50 in the case CA.

The semi-reflective mirror 30 is provided between the projection target member FG and the second mirror 50 in the Dx direction. The semi-reflective mirror 30 is disposed between the first mirror 40 and the display panel 10 in the Dz direction.

As illustrated in FIG. 10, the light L2, the light C2, and the light U2 are reflected by the second mirror 50 as light L1', light C1', and light U1', respectively, and guided to the projection target member FG through the semi-reflective mirror 30.

As illustrated in FIG. 10, the right-handed circularly polarized light U4 incident on the semi-reflective mirror 30 from the display panel 10 passes through the semi-reflective mirror 30 and is incident on the first mirror 40. The light U3 reflected by the first mirror 40 is circularly polarized in the inverted direction, that is, left-handed circularly polarized and is incident on the semi-reflective mirror 30. The light U2 reflected by the semi-reflective mirror 30 is incident on the second mirror 50 as left-handed circularly polarized light. The light U1' reflected by the second mirror 50 passes through the semi-reflective mirror 30, and then reaches the projection target member FG as left-handed circularly polarized light and is projected onto the projection point PP3 of the projection target member FG.

The positional relations of the virtual image points VP1, VP2, and VP3 recognized by the user U, in particular, the positional relations in the Dx direction thereof correspond to the optical path lengths of the light U2, the light C2, and the light L2, respectively, and the optical path lengths of the light U1', the light C1', and the light L1', respectively.

The magnitude relation between the optical path lengths of the light L1', the light C1', and the light U1' is U1'>C1'>L1', and when the difference in the optical path lengths is increased, the magnification Ex becomes high, which affects the depth of the virtual image VG.

With this configuration, the HUD 100A can reduce the amount of decrease of the luminance of the virtual image while maintaining the stereoscopic effect of the virtual image.

Third Embodiment

Figure 11:
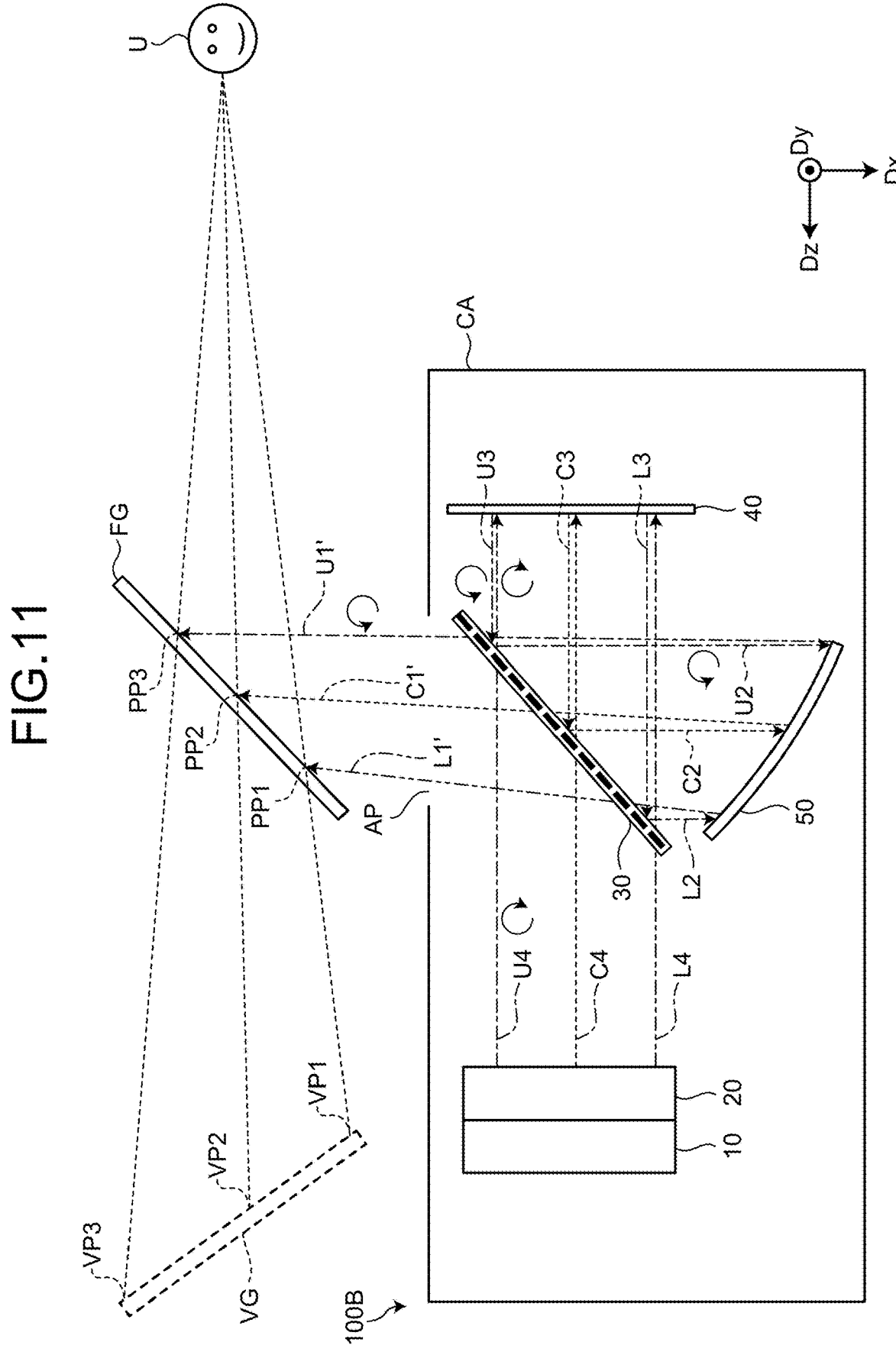
FIG. 11 is a schematic diagram illustrating an exemplary configuration of a HUD according to a third embodiment.
Figure 12:
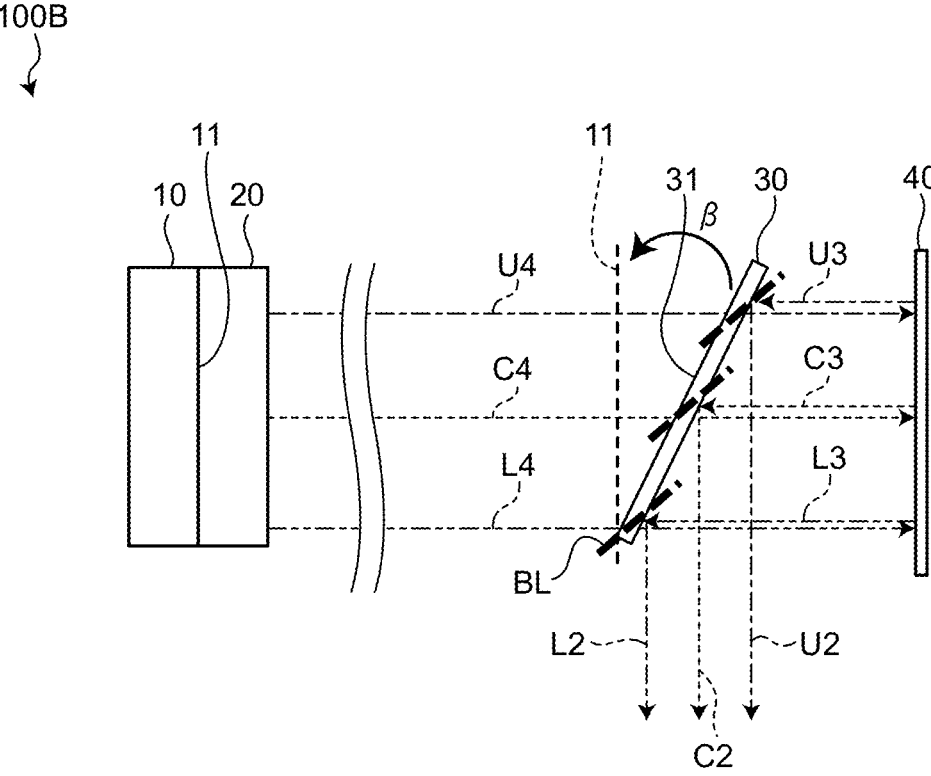
FIG. 12 is an enlarged schematic diagram of FIG. 11.
Figure 12:
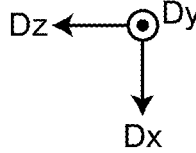

FIG. 11 is a schematic diagram illustrating an exemplary configuration of a HUD according to a third embodiment. FIG. 12 is an enlarged schematic diagram of FIG. 11. In the following description, any constituent component same as that in the above-described embodiments is denoted by the same reference sign and duplicate description thereof is omitted. In addition, description of optical paths of light, which overlaps with description of the HUD according to the second embodiment, is omitted.

As illustrated in FIG. 11, a HUD 100B includes the display panel 10, the first ¼ wave plate 20, the semi-reflective mirror 30, the first mirror 40, and the second mirror 50 in the case CA.

The first mirror 40 is disposed on the back side of the semi-reflective mirror 30 in the Dz direction. The display panel 10 is disposed on the front side of the first mirror 40. The semi-reflective mirror 30 is provided between the first mirror 40 and the display panel 10 in the Dz direction.

The magnitude relation between the optical path lengths of the light L2+the light L3, the light C2+the light C3, and the light U2+the light U3 is U2+U3>C2+C3>L2+L3, and difference in the optical path lengths occurs.

With this configuration, the HUD 100B can reduce the amount of decrease of the luminance of the virtual image while maintaining the stereoscopic effect of the virtual image.

As illustrated in FIG. 12, an angle β of 0° or an acute angle is formed between the surface 31 of the semi-reflective mirror 30 by which light is reflected to the projection target member FG and the surface 11 of the display panel 10 through which light from the display panel is emitted. By continuously changing the orientation pitch of the liquid crystal molecules LC forming the Bragg plane BL, the angle formed between the Bragg plane BL formed by the liquid crystal molecules LC of the semi-reflective mirror 30 and each of the optical path lengths of the light L2, the light C2, and the light U2 can be set to an optional angle with which the angle formed between each of the optical path lengths of the light L2, the light C2, and the light U2 and the corresponding one of the optical path lengths of the light L3, the light C3, and the light U3 is 90°.

With this configuration, light reflected by the semi-reflective mirror 30 can be reliably condensed to the second mirror 50 and prevented from scattering.

Fourth Embodiment

Figure 13:
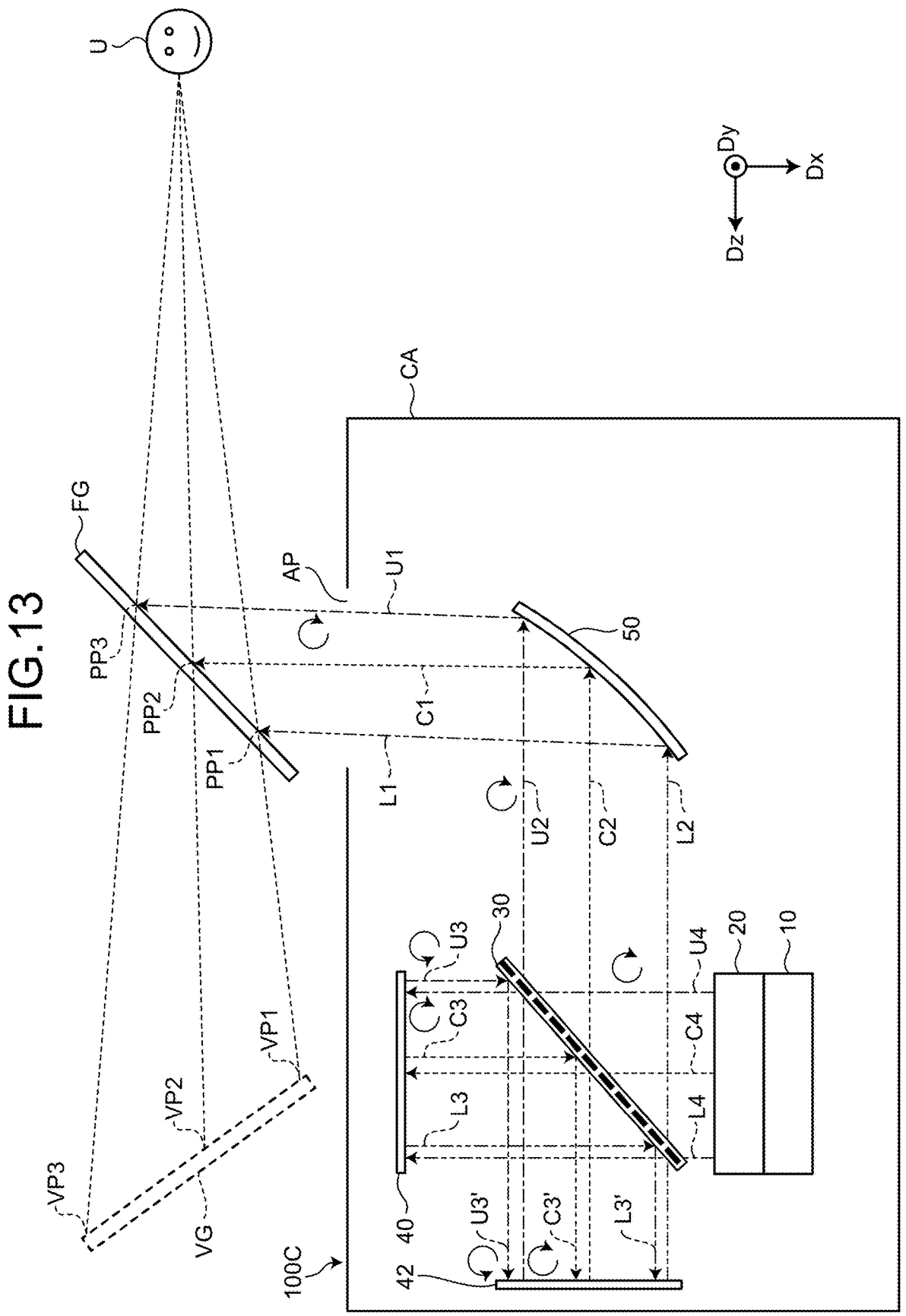
FIG. 13 is a schematic diagram illustrating an exemplary configuration of a HUD according to a fourth embodiment.

FIG. 13 is a schematic diagram illustrating an exemplary configuration of a HUD according to a fourth embodiment. In the following description, any constituent component same as that in the above-described embodiments is denoted by the same reference sign and duplicate description thereof is omitted. In addition, description of optical paths of light, which overlaps with description of the HUD according to the first embodiment, is omitted.

As illustrated in FIG. 13, a HUD 100C includes the display panel 10, the first ¼ wave plate 20, the semi-reflective mirror 30, the first mirror 40, a third mirror 42, and the second mirror 50 in the case CA.

The first mirror 40 is disposed on the upper side of the semi-reflective mirror 30 in the Dx direction. The third mirror 42 is disposed on the front side of the semi-reflective mirror 30 in the Dz direction.

The semi-reflective mirror 30 is disposed closer to the front side of the vehicle than the projection target member FG. The semi-reflective mirror 30 is provided between the first mirror 40 and the display panel 10 in the Dx direction. The semi-reflective mirror 30 is provided between the third mirror 42 and the second mirror 50 in the Dy direction.

As illustrated in FIG. 13, the third mirror 42 is an optical element that reflects, to the semi-reflective mirror 30, light reflected by the first mirror 40 through the semi-reflective mirror 30. Light reflected toward the third mirror 42 in the light L3 is referred to as light L3'. Light reflected toward the third mirror 42 in the light C3 is referred to as light C3'. Light reflected toward the third mirror 42 in the light U3 is referred to as light U3'.

As illustrated in FIG. 13, light guided to the second mirror 50 through the cholesteric liquid crystal layer 30a by the third mirror 42 in the light L3' is referred to as the light L2. Light guided to the second mirror 50 through the semi-reflective mirror 30 by the third mirror 42 in the light C3' is referred to as the light C2. Light guided to the second mirror 50 through the semi-reflective mirror 30 by the third mirror 42 in the light U3' is referred to as the light U2.

As illustrated in FIG. 13, the light L2, the light C2, and the light U2 are reflected by the second mirror 50 as the light L1, the light C1, and the light U1, respectively, and guided to the projection target member FG through the semi-reflective mirror 30.

As illustrated in FIG. 13, the right-handed circularly polarized light U4 incident on the semi-reflective mirror 30 from the display panel 10 passes through the semi-reflective mirror 30 and is incident on the first mirror 40. The light U3 reflected by the first mirror 40 is circularly polarized in the inverted direction, that is, left-handed circularly polarized and is incident on the semi-reflective mirror 30. The light U3' reflected by the semi-reflective mirror 30 is incident on the third mirror 42 as left-handed circularly polarized light. The light U2 reflected by the third mirror 42 is circularly polarized in the inverted direction, that is, right-handed circularly polarized and is incident on the second mirror 50. The light U1 reflected by the second mirror 50 passes through the semi-reflective mirror 30, and then reaches the projection target member FG as right-handed circularly polarized and is projected onto the projection point PP3 of the projection target member FG.

The magnitude relation between the optical path lengths between the first mirror 40, the third mirror 42, and the semi-reflective mirror 30 is U3+U3'=C3+C3'=L3+L3'. In this case, the magnitude relation between the optical path lengths of the light L2, the light C2, and the light U2 is U2=C2=L2. The magnitude relation between the optical path lengths of the light L1, the light C1, and the light U1 is U1=C1=L1. The magnitude relation between the optical path lengths of the light L2, the light C2, and the light U2 is U2>C2>L2. Since the two mirrors are used, the difference in the optical path lengths is increased, and thus, the magnification Ex becomes high, which affects the depth of the virtual image VG.

With this configuration, the HUD 100C can reduce the amount of decrease of the luminance of the virtual image while maintaining the stereoscopic effect of the virtual image.

Moreover, when the set of the display panel 10, the semi-reflective mirror 30, and the first mirror 40 is relocated closer to the second mirror 50 in the Dz direction while the difference in the optical path lengths is maintained, the space occupied by components in the case CA is reduced.

Fifth Embodiment

Figure 14:
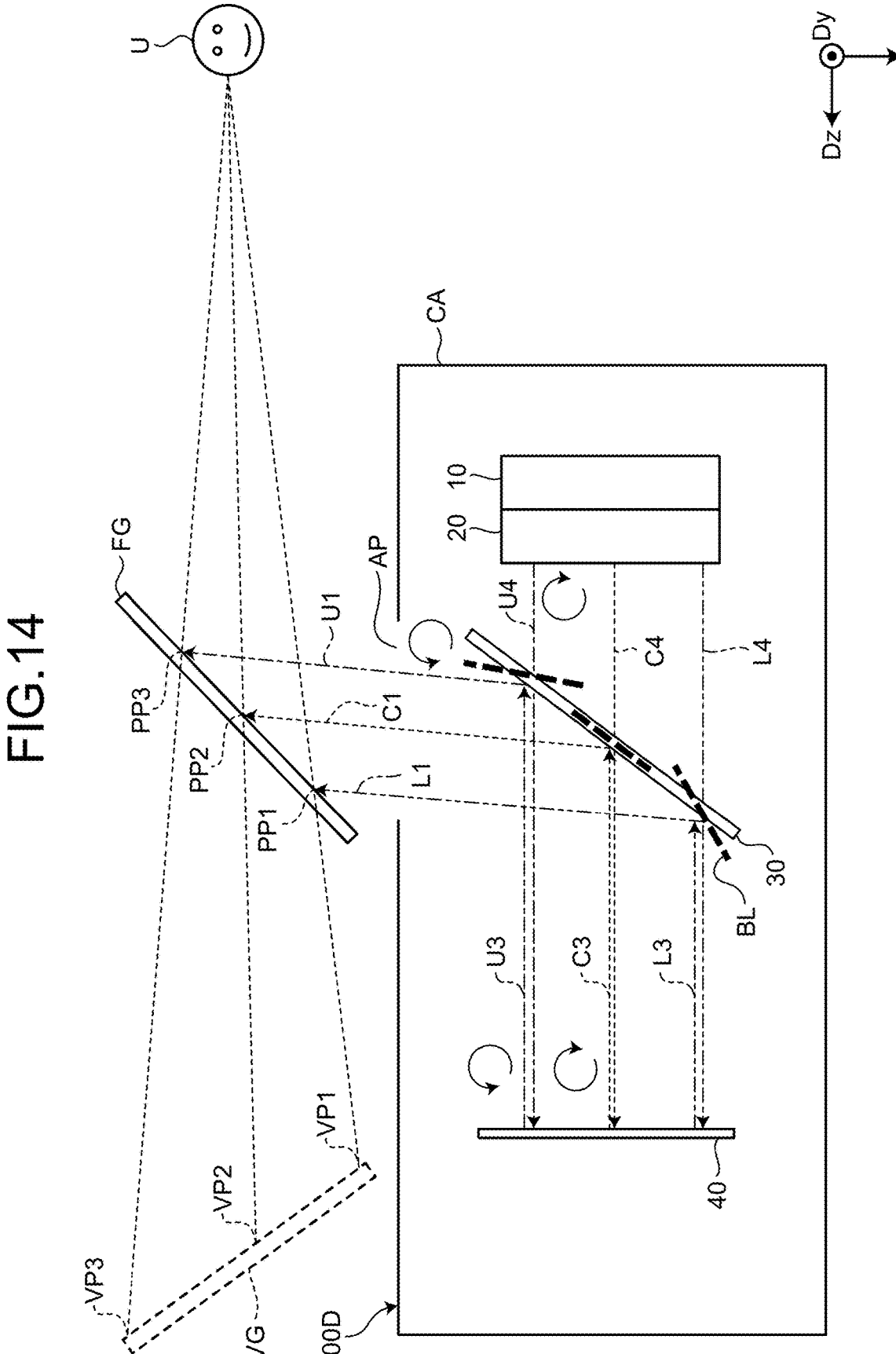
FIG. 14 is a schematic diagram illustrating an exemplary configuration of a HUD according to a fifth embodiment.
Figure 15:
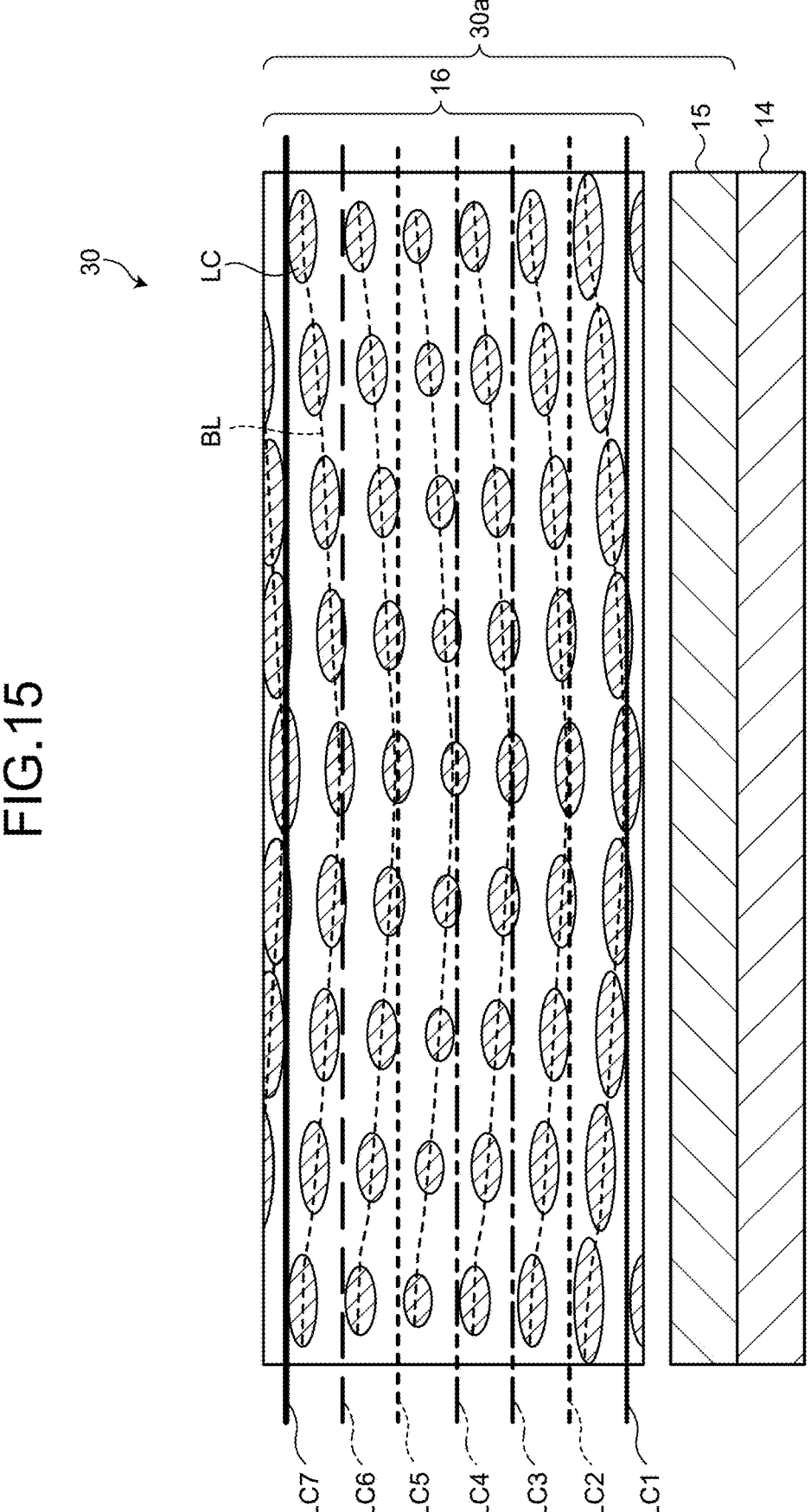
FIG. 15 is a sectional view schematically illustrating a cholesteric liquid crystal layer according to the fifth embodiment.
Figure 16:
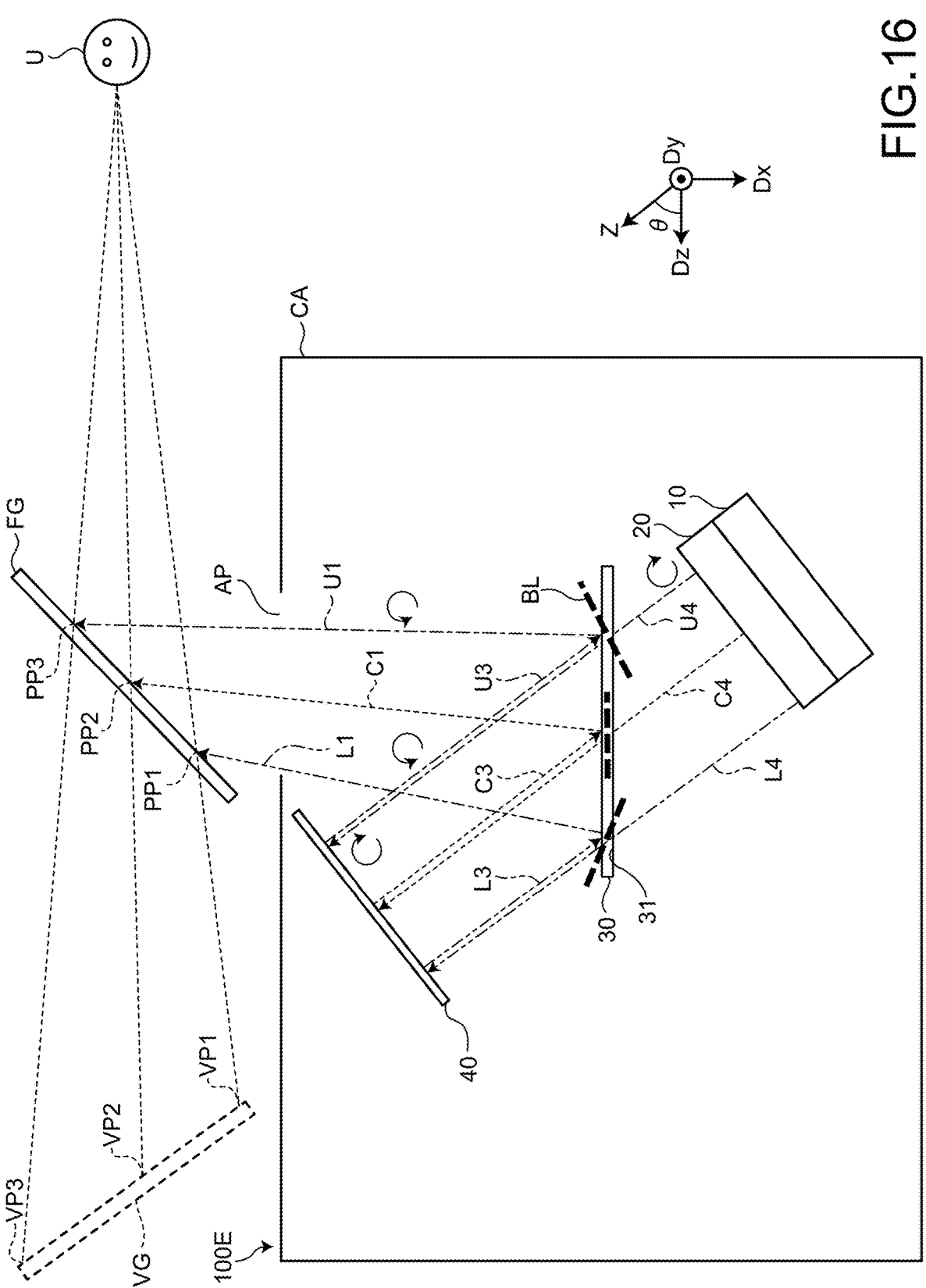
FIG. 16 is a schematic diagram illustrating an exemplary configuration of a HUD according to a sixth embodiment.

FIG. 14 is a schematic diagram illustrating an exemplary configuration of a HUD according to a fifth embodiment. FIG. 15 is a sectional view schematically illustrating a cholesteric liquid crystal layer according to the fifth embodiment. FIG. 16 is a sectional view schematically illustrating a Bragg plane in the cholesteric liquid crystal layer according to the fifth embodiment. In the following description, any constituent component same as that in the above-described embodiments is denoted by the same reference sign and duplicate description thereof is omitted. In addition, description of optical paths of light, which overlaps with description of the HUD according to the first embodiment, is omitted.

As illustrated in FIG. 14, a HUD 100D includes the display panel 10, the first ¼ wave plate 20, the semi-reflective mirror 30, and the first mirror 40 in the case CA.

As illustrated in FIG. 14, the semi-reflective mirror 30 is disposed on the lower side of the projection target member FG in the Dx direction. The semi-reflective mirror 30 is provided between the first mirror 40 and the display panel 10 in the Dz direction.

As illustrated in FIG. 14, the light L3, the light C3, and the light U3 are reflected by the semi-reflective mirror 30 as the light L1, the light C1, and the light U1, respectively, and guided to the projection target member FG.

The positional relations of the virtual image points VP1, VP2, and VP3 recognized by the user U, in particular, the positional relations in the Dz direction thereof correspond to the optical path lengths of the light U3, the light C3, and the light L3, respectively, and the optical path lengths of the light U1, the light C1, and the light L1, respectively.

As illustrated in FIG. 14, the right-handed circularly polarized light U4 incident on the semi-reflective mirror 30 from the display panel 10 passes through the semi-reflective mirror 30 and is incident on the first mirror 40. The light U3 reflected by the first mirror 40 is circularly polarized in the inverted direction, that is, left-handed circularly polarized and is incident on the semi-reflective mirror 30. The light U1 reflected by the semi-reflective mirror 30 is projected as left-handed circularly polarized light onto the projection point PP3 of the projection target member FG through the semi-reflective mirror 30.

As illustrated in FIG. 15, the Bragg plane BL that is concave toward the projection target member FG can be formed by the liquid crystal molecules LC of the cholesteric liquid crystal layer 30a by continuously changing the orientation pitch of the liquid crystal molecules LC.

With this configuration, the cholesteric liquid crystal layer 30a can function like a concave mirror, and thus the second mirror 50 is unnecessary and the space occupied by components in the case CA is reduced.

Moreover, since after having passed through the cholesteric liquid crystal layer 30a, the light L4, the light C4, and the light U4 return from the first mirror 40 to the cholesteric liquid crystal layer 30a, the optical path lengths are increased and the magnification Ex becomes high, and thus the size of the second mirror 50 can be reduced.

Sixth Embodiment

FIG. 16 is a schematic diagram illustrating an exemplary configuration of a HUD according to a sixth embodiment. In the following description, any constituent component same as that in the above-described embodiments is denoted by the same reference sign and duplicate description thereof is omitted. In addition, description of optical paths of light, which overlaps with description of the HUD according to the fifth embodiment, is omitted.

As illustrated in FIG. 16, a HUD 100E includes the display panel 10, the first ¼ wave plate 20, the semi-reflective mirror 30, and the first mirror 40 in the case CA. A Z direction is defined to be the normal of the surface 11 of the display panel 10 through which light is emitted to the semi-reflective mirror 30. The angle between the Z direction and the Dz direction is a polar angle θ and an acute angle.

As illustrated in FIG. 16, the semi-reflective mirror 30 is disposed on the lower side of the projection target member FG in the Dx direction. The surface 31 of the semi-reflective mirror 30 through which light from the display panel 10 is transmitted is disposed in the horizontal direction along the Dz direction. The semi-reflective mirror 30 is provided between the first mirror 40 and the display panel 10 in the Z direction. The first mirror 40 is tilted relative to the horizontal direction. The first mirror 40 is disposed closer to the front side of the vehicle than the projection target member FG.

The magnitude relation between the optical path lengths of the light L4, the light C4, and the light U4 is U4=C4=L4. The magnitude relation between the optical path lengths of the light L3, the light C3, and the light U3 is U3>C3>L3 and the magnitude relation between the optical path lengths of the light L1, the light C1, and the light U1 is U1>C1>L1, and thus the difference in the optical path lengths is maximized, which affects the depth of the virtual image VG.

With this configuration, the HUD 100E can reduce the amount of decrease of the luminance of the virtual image while maintaining the stereoscopic effect of the virtual image.

Seventh Embodiment

Figure 17:
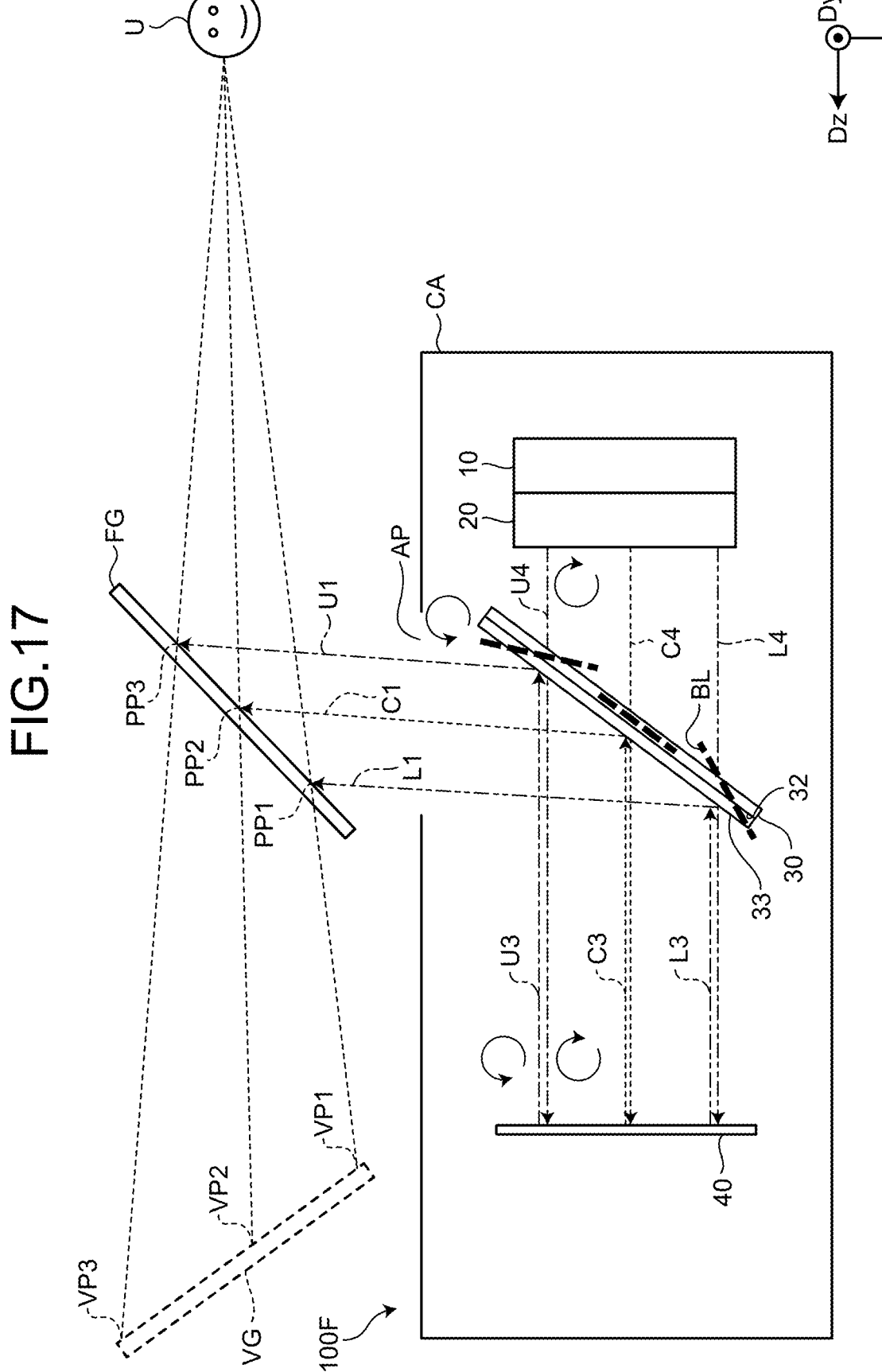
FIG. 17 is a schematic diagram illustrating an exemplary configuration of a HUD according to a seventh embodiment.

FIG. 17 is a schematic diagram illustrating an exemplary configuration of a HUD according to a seventh embodiment. In the following description, any constituent component same as that in the above-described embodiments is denoted by the same reference sign and duplicate description thereof is omitted. In addition, description of optical paths of light, which overlaps with description of the HUD according to the fifth embodiment, is omitted.

As illustrated in FIG. 17, a HUD 100F includes the display panel 10, the semi-reflective mirror 30, and the first mirror 40 in the case CA.

An antireflection film 33 is bonded to a surface 32 of the semi-reflective mirror 30 on the projection target member FG side of the cholesteric liquid crystal layer 30a. The antireflection film 33 is, for example, an anti-reflection (AR) film for preventing light reflection.

With this configuration, when the light L3, the light C3, and the light U3 reflected by the first mirror 40 and the semi-reflective mirror 30 and guided to the projection target member FG as the light L1, the light C1, and the light U1, respectively, it is possible to reduce a surface reflection component generated from the surface 32 and reduce ghost generation, thereby obtaining excellent appearance of the virtual image.

Eighth Embodiment

Figure 18:
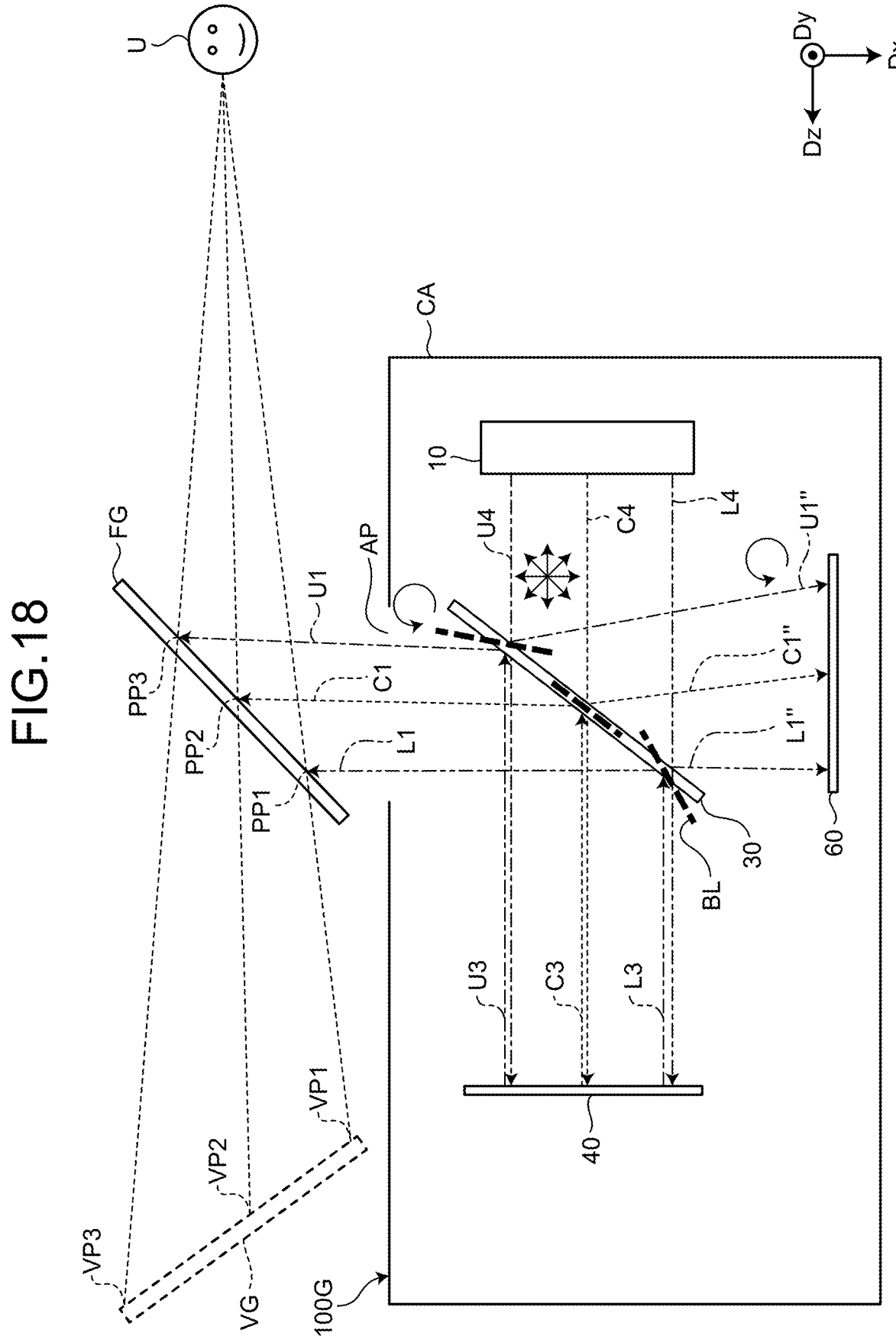
FIG. 18 is a schematic diagram illustrating an exemplary configuration of a HUD according to an eighth embodiment.

FIG. 18 is a schematic diagram illustrating an exemplary configuration of a HUD according to an eighth embodiment. In the following description, any constituent component same as that in the above-described embodiments is denoted by the same reference sign and duplicate description thereof is omitted. In addition, description of optical paths of light, which overlaps with description of the HUD according to the fifth embodiment, is omitted.

As illustrated in FIG. 18, a HUD 100G includes the display panel 10, the first ¼ wave plate 20, the semi-reflective mirror 30, and the first mirror 40 in the case CA.

The HUD 100G further includes an absorption member 60 on the lower side of the semi-reflective mirror 30 in the Dx direction.

As illustrated in FIG. 18, light reflected by the semi-reflective mirror 30 and incident toward the absorption member 60 in the light L3 is referred to as light L1". Light reflected by the semi-reflective mirror 30 and incident toward the absorption member 60 in the light C3 is referred to as light C1". Light reflected by the semi-reflective mirror 30 and incident toward the absorption member 60 in the light U3 is referred to as light U1".

The absorption member 60 contains pigment that absorbs light having any unnecessary wavelength. For example, the absorption member 60 is preferably made of a black resin material and may be made of black paper.

As illustrated in FIG. 18, the light U4 emitted from the display panel 10 and transmitted through the semi-reflective mirror 30 is incident on the semi-reflective mirror 30 as non-polarized light. In this case, only appropriate circularly polarized light is reflected by the projection target member FG and recognized as a HUD image by the user U.

Figure 19:
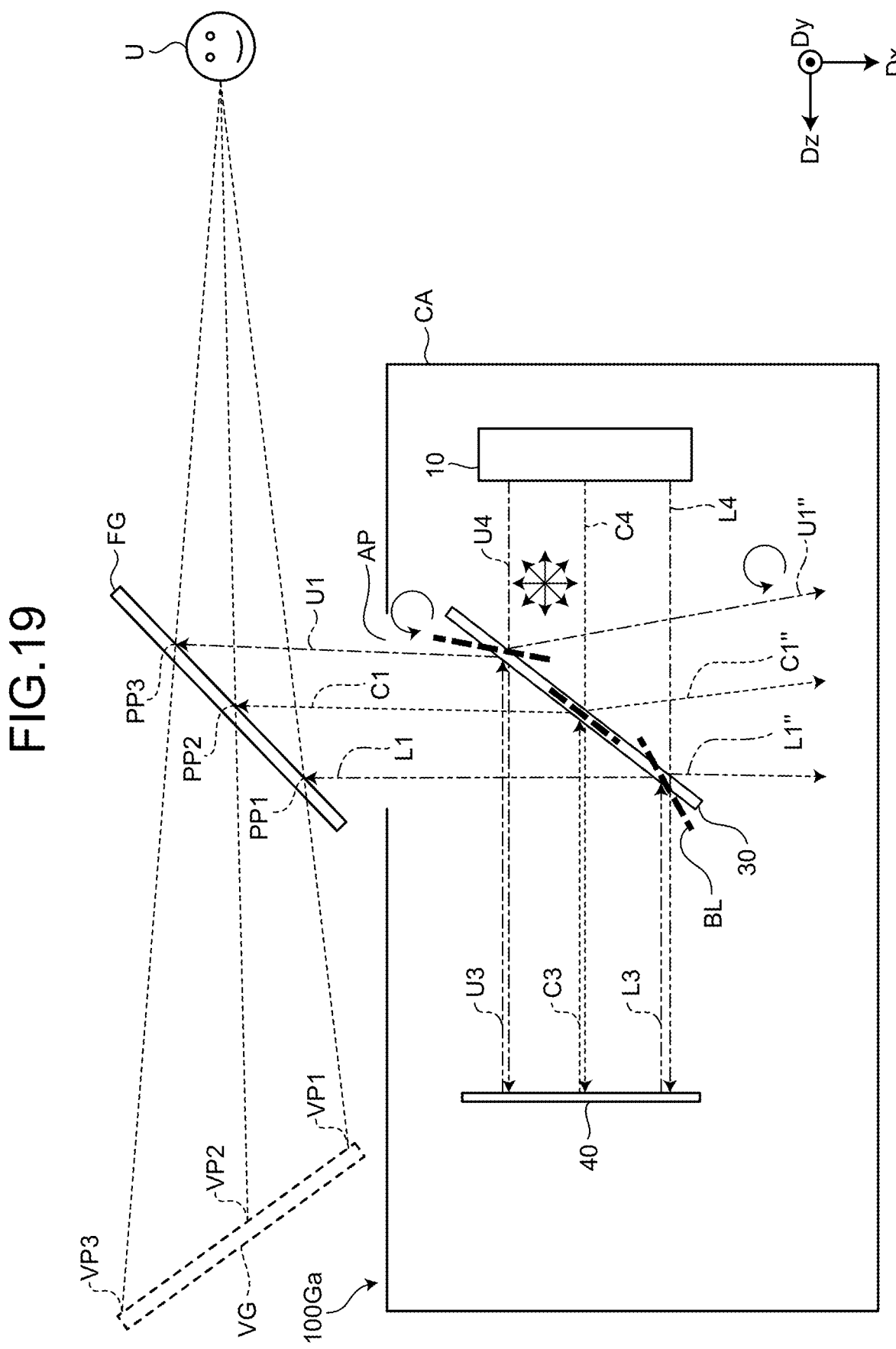
FIG. 19 is a schematic diagram illustrating an exemplary configuration of a HUD according to a first comparative example.

FIG. 19 is a schematic diagram illustrating a HUD according to a first comparative example. This HUD 100Ga according to the first comparative example does not include the absorption member 60 on the lower side of the semi-reflective mirror 30 compared with the HUD 100G illustrated in FIG. 18.

As illustrated in FIG. 19, with the configuration of the HUD 100Ga according to the first comparative example, circularly polarized light that matches the orientation of the twist of the cholesteric liquid crystal layer 30a is reflected when the light L4, the light C4, and the light U4 are incident on the semi-reflective mirror 30, and thus the circularly polarized light L1", C1", and U1" reflected by the first mirror 40 and transmitted through the semi-reflective mirror 30 cannot be absorbed but scatters.

However, with the configuration of the HUD 100G, since the absorption member 60 is disposed on the lower side of the cholesteric liquid crystal layer 30a, scattering of the light L1", C1", and U1" can be reduced when the light L4, the light C4, and the light U4 are incident on the semi-reflective mirror 30.

Ninth Embodiment

Figure 20:
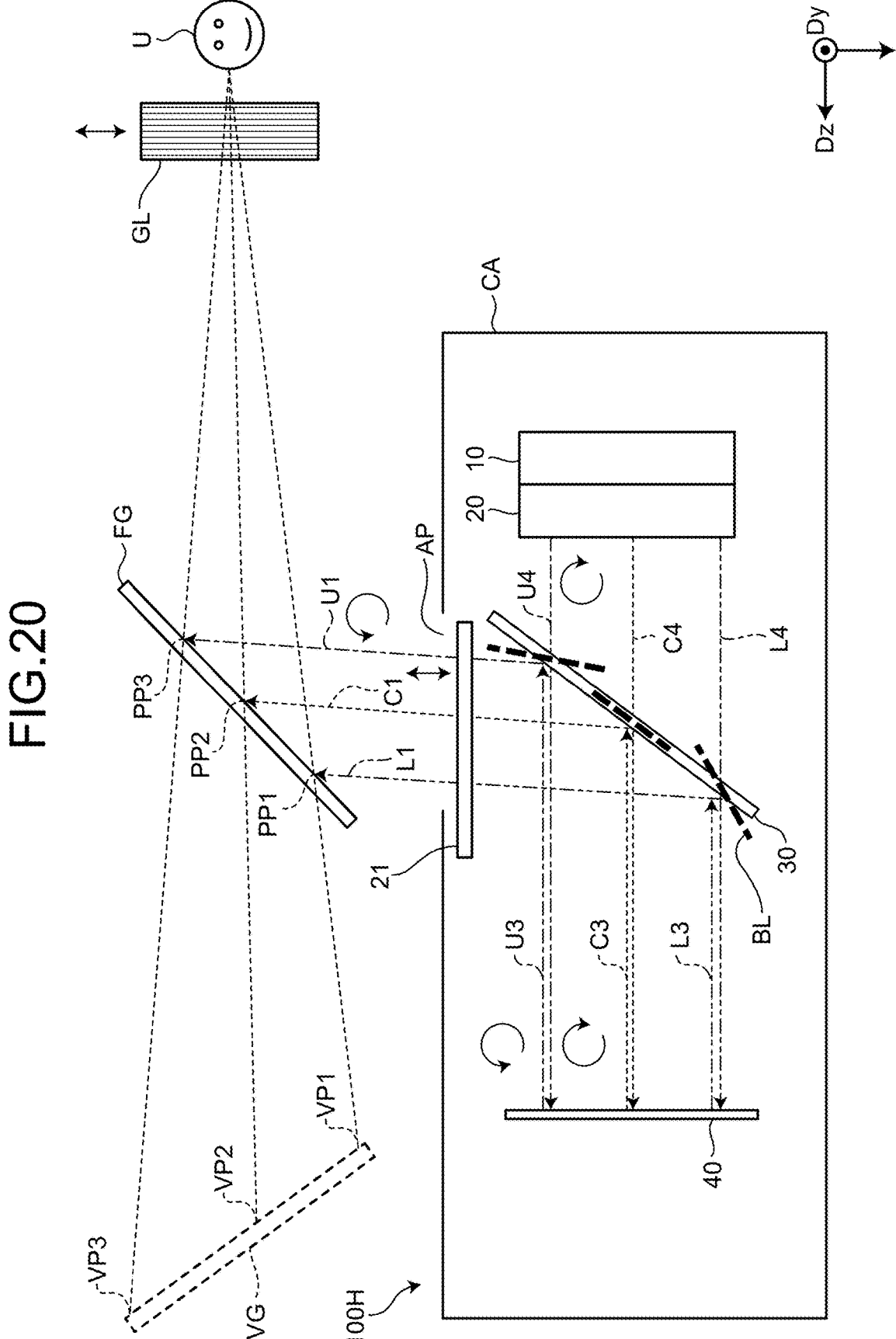
FIG. 20 is a schematic diagram illustrating an exemplary configuration of a HUD according to a ninth embodiment.

FIG. 20 is a schematic diagram illustrating an exemplary configuration of a HUD according to a ninth embodiment. In the following description, any constituent component same as that in the above-described embodiments is denoted by the same reference sign and duplicate description thereof is omitted. In addition, description of optical paths of light, which overlaps with description of the HUD according to the fifth embodiment, is omitted.

As illustrated in FIG. 20, a HUD 100H includes the display panel 10, the first ¼ wave plate 20, the semi-reflective mirror 30, and the first mirror 40 in the case CA.

The HUD 100H further includes a second ¼ wave plate 21 directly below the opening part AP between the semi-reflective mirror 30 and the projection target member FG in the Dx direction.

The second ¼ wave plate 21 converts the light U1, the light C1, and the light L1 reflected by the semi-reflective mirror 30 from circularly polarized incident light into linearly polarized incident light.

As illustrated in FIG. 20, the user U wears polarization sunglasses GL and visually recognizes an image projected by the HUD 100H.

The user U who wears the polarization sunglasses GL have difficulty in viewing the virtual image VG when the light is circularly polarized light. Thus, by converting the circularly polarized light into linearly polarized light through the second ¼ wave plate 21, it is possible to improve the difficulty of viewing even when the user wears the polarization sunglasses.

It should be understood that, among other effects achieved by aspects described in the above-described embodiments, those clear from the present specification description or those that could be thought of by the skilled person in the art as appropriate are achieved by the present disclosure.

What is claimed is:

1. A head up display comprising, inside a case:
   a display panel that is configured to emit light to project an image;
   a first mirror that is configured to reflect light having passed through the display panel; and
   a semi-reflective mirror provided between the display panel and the first mirror, wherein
   the semi-reflective mirror includes a cholesteric liquid crystal layer that is configured to transmit light from the display panel and reflect light from the first mirror, and
   an acute angle is formed between a surface of the semi-reflective mirror through which light from the display panel is transmitted and a surface of the display panel through which light from the display panel is emitted.

2. The head up display according to claim 1, further comprising a first ¼ wave plate that is provided between the display panel and the semi-reflective mirror and configured to converts light from the display panel into circularly polarized light.

3. The head up display according to claim 1, further comprising a second mirror that is provided inside the case and configured to reflect light from the semi-reflective mirror to a projection target member that is a light-transmitting member provided outside the case.

4. The head up display according to claim 3, further comprising a third mirror on which light reflected by the first mirror and further reflected by the semi-reflective mirror is incident, and which is configured to reflect the incident light to the semi-reflective mirror and provided inside the case, wherein light from the third mirror passes through the semi-reflective mirror and reaches the second mirror.

5. The head up display according to claim 1, further comprising a second mirror on which light reflected by the first mirror and further reflected by the semi-reflective mirror is incident, and which is configured to reflect the incident light to the semi-reflective mirror and provided inside the case, wherein light from the second mirror passes through the semi-reflective mirror and reaches a projection target member that is a light-transmitting member provided outside the case.

6. The head up display according to claim 5, wherein an angle of 0° or an acute angle is formed between a surface of the semi-reflective mirror by which light is reflected to the projection target member and the surface of the display panel through which light from the display panel is emitted.

7. The head up display according to claim 1, wherein the cholesteric liquid crystal layer contains liquid crystal molecules that are configured to helically rotate, and a concave Bragg plane is formed by the liquid crystal molecules.

8. The head up display according to claim 7, wherein light from the first mirror is reflected by the semi-reflective mirror and reaches a projection target member that is a light-transmitting member provided outside the case, the surface of the semi-reflective mirror through which light from the display panel is transmitted is disposed in the horizontal direction, and the first mirror is tilted relative to the horizontal direction.

9. The head up display according to claim 7, wherein light from the first mirror is reflected by the semi-reflective mirror and reaches a projection target member that is a light-transmitting member provided outside the case, and the semi-reflective mirror includes an antireflection film at a surface on a projection target member side of the cholesteric liquid crystal layer.

10. The head up display according to claim 7, wherein part of light from the first mirror is reflected by the semi-reflective mirror and reaches a projection target member that is a light-transmitting member provided outside the case, and the head up display further comprises an absorption member that is configured to absorb circularly polarized light that is other part of the light from the first mirror, the other part having passed through the semi-reflective mirror.

11. The head up display according to claim 7, wherein part of light from the first mirror is reflected by the semi-reflective mirror and reaches a projection target member that is a light-transmitting member provided outside the case, and the head up display further comprises a second ¼ wave plate between the semi-reflective mirror and the projection target member.

* * * * *